United States Patent [19]

Lucero

[11] Patent Number: 5,038,022

[45] Date of Patent: Aug. 6, 1991

[54] APPARATUS AND METHOD FOR PROVIDING CREDIT FOR OPERATING A GAMING MACHINE

[76] Inventor: James L. Lucero, 280 Arbolada Dr., Arcadia, Calif. 91006

[21] Appl. No.: 453,991

[22] Filed: Dec. 19, 1989

[51] Int. Cl.⁵ .................. G06F 15/44; G06F 15/21
[52] U.S. Cl. .................... 235/380; 235/381; 235/375; 902/23; 364/410; 273/138 A
[58] Field of Search .............. 235/375, 379, 380, 381, 235/382, 383; 902/22, 23, 32; 364/410, 412, 400, 401, 408, 479; 273/138 A; 340/825.31, 825.33, 825.34, 825.35

[56] References Cited

U.S. PATENT DOCUMENTS

| | | | |
|---|---|---|---|
| 4,322,612 | 3/1982 | Lange | 364/412 |
| 4,335,809 | 6/1982 | Wain | 273/138 A |
| 4,339,798 | 7/1982 | Hedges et al. | 364/412 |
| 4,467,424 | 8/1984 | Hedges et al. | 364/412 |
| 4,575,622 | 3/1986 | Pellegrini | 235/382 |
| 4,594,663 | 6/1986 | Nagata et al. | 364/401 |
| 4,636,951 | 1/1987 | Harlick | 364/412 |
| 4,639,889 | 1/1987 | Matsumoto et al. | 235/379 |
| 4,648,600 | 3/1987 | Olliges | 273/138 A |
| 4,652,998 | 3/1987 | Koza et al. | 364/412 |
| 4,669,596 | 6/1987 | Capers et al. | 235/381 |
| 4,669,730 | 6/1987 | Small | 273/138 A |
| 4,674,055 | 6/1987 | Ogaki et al. | 902/22 |
| 4,674,618 | 6/1987 | Eglise et al. | 235/381 |
| 4,675,515 | 6/1987 | Lucero | 235/381 |
| 4,689,742 | 8/1987 | Troy et al. | 364/412 |
| 4,812,805 | 3/1989 | Lachat et al. | 235/384 |
| 4,815,741 | 3/1989 | Small | 273/138 A |
| 4,842,278 | 6/1989 | Markowicz | 364/412 |
| 4,884,212 | 11/1989 | Stutsman | 364/479 |

OTHER PUBLICATIONS

"New Australian Gaming Complexes Usher in Era of Cashless Card-Based Watering", Card News, p. 3, Jun. 6, 1988.
Ringer, R., "Casino Machines to Accept Debit Cards", American Banker, vol. 148, p. 3, May 1983.
"Legislation Takes Cash Out of Casinos", Las Vegas Sun, Apr. 2, 1985.

Primary Examiner—Stuart S. Levy
Assistant Examiner—Robert A. Weinhardt
Attorney, Agent, or Firm—Cooper & Dunham

[57] ABSTRACT

The apparatus for enabling a gaming machine in an establishment to provide credit to a player operating the machine without the player leaving the machine. The gaming machine has a card reader associated with it for transmitting player related financial data to a remote location for approval. A first code identifies the particular gaming machine and a second code identifies the establishment in which the gaming machine is located. A visual display on the gaming machine indicates the amount of credit approved and usable by the player and enables the player to operate the gaming machine to use the credit.

13 Claims, 2 Drawing Sheets

APPARATUS AND METHOD FOR PROVIDING CREDIT FOR OPERATING A GAMING MACHINE

TECHNICAL FIELD

The present invention relates to gaming systems in general and in particular, to a method and apparatus for providing credit for operating a gaming machine such as, for example, a slot machine. A visual display, keyboard, and card reader are associated with the gaming machine to provide credit to the player upon approval of his credit card or by debiting his account with a debit card.

BACKGROUND OF THE INVENTION

It is well known that gambling casinos and other business establishments have a plurality of gaming machines, such as, for example only, slot machines in which a player can insert coins, pull a handle, and hope for a winning combination of elements on spinning reels, which allow him to obtain money from the machine. These machines are simply games of chance that some individuals play for entertainment and others play with the hope of receiving winnings.

Some casinos have cashiers located at strategic positions in the casino for use by patrons to obtain coins for use in playing the gaming machines When a player is at a gaming machine and needs more coins, he must walk away from the machine, find a cashier and obtain more coins. This may give a player the opportunity to change his mind about playing the machine further. In addition, it may mean that the player will lose his place at the machine which may make it difficult for the player if he feels that the machine is about ready to "payoff". Further, sometimes a player feels that he is on a "roll" and does not want to interrupt the playing because of his winning streak. Thus, the present system disrupts the playing of the machine which is undesirable from the standpoint of the owner and may be undesirable from the standpoint of the player.

SUMMARY OF THE INVENTION

The present invention relates to a gaming machine, such as a slot machine, for use within a casino or other establishment to enable a player's participation at a particular machine such that the player can obtain further credit for playing the machine as needed without relinquishing his position at the machine.

In the preferred embodiment, each machine has associated therewith and forming part thereof a card reader, a visual display, and a keyboard entry pad. This enables a player, without leaving his position at the machine, to insert his debit card in a slot of the card reader forming part of the machine to automatically debit his account at a financial institution in the amount entered through the keyboard pad thereby giving the player a credit balance visually displayed which the player can "playoff" simply by continuing to operate the machine. In this embodiment, once the account has been debited and the visual display indicates the amount of credit obtained, the player uses the credit to continue to play without leaving his place at the machine In an alternate embodiment, the player, without giving up his position at the machine, inserts a credit card in the reader, enters the amount of credit desired and the P.I.N. number (personal identification number) of the player, has the credit card automatically checked for verification of the credit from a remote location, presses a keyboard "enter" key after the card has been approved and automatically obtains a credit balance that is indicated on the visual display.

The credit card can be used in various ways in conjunction with the gaming machine. In one embodiment, the machine issues a credit slip which is signed by the player for the amount of credit and retained by the casino or establishment to remit to the player's financial institution. In another embodiment, the credit card is simply swiped through the card reader groove and the dollar amount entered. The card reader includes a slot machine code to identify that particular machine, an establishment code to identify the establishment and transmits that information along with any codes on the card to identify the player and the financial institution issuing the card. In that instance, the player's financial institution simply debits the player's account and credits the establishment s account for the dollar amount of credit obtained.

SUMMARY

The present invention is used in a casino or other establishment where gaming machines are available to enable each gaming machine to provide credit to a player operating the machine and comprises means forming part of the gaming machine and coupled to a remote financial institution to obtain credit for the player that is usable by the player operating the machine, a visual display on the gaming machine for indicating the amount of credit useful by the player and means coupled to the credit obtaining means for enabling the player to use the indicated credit to operate the gaming machine. The invention also relates to apparatus for enabling a gaming machine to provide credit through a player operating the machine with the use of a financial card such as a credit card or a debit card.

BRIEF DESCRIPTION OF THE DRAWING

These and other objects of the present invention will be disclosed in conjunction with the accompanying drawings in which like numerals represent like elements and in which.

DETAILED DESCRIPTION OF THE DRAWINGS

Gambling casinos and gaming parlor include a variety of gaming machines such as slot machines, poker machines which actually play a card game and other types. Some of these machines dispense coins as the player obtains a winning combination while in others credit is obtained and indicated on the machine. The player can use the credit to continue to play the machine or the credit can be converted to cash by a cashier in the casino. In such cases, a display of some type, such as a liquid crystal display, may indicate the credit available on that particular machine. However, when the credit has been used and none remains, the player must then insert more coins. If that occurs, the player must leave his place at the machine, find a cashier and then obtain more coins with which to operate the machine. In such case, the player, when he returns to the machine, may find it occupied by another player. This may be particularly frustrating to a player if he believes that that particular machine is about ready to "payoff" or if he believes he is on a particular lucky streak with that machine.

Figure 1:
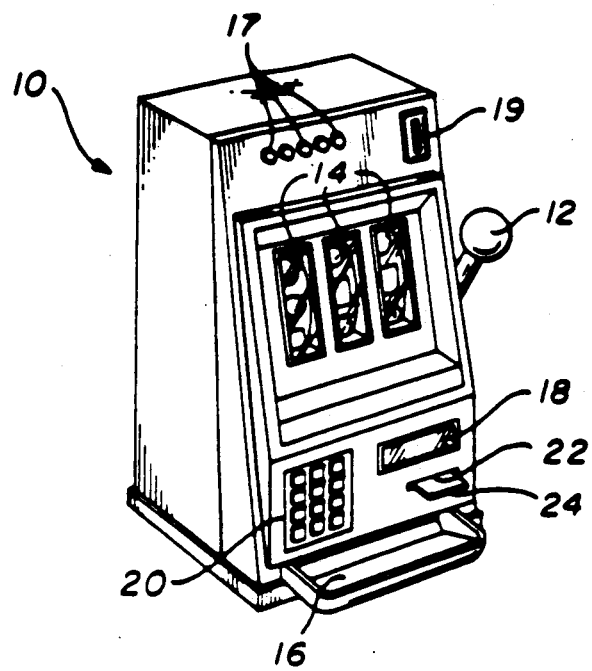
FIG. 1 is an isometric view of a gaming machine, such as a slot machine, that incorporates the present invention and enables a player to obtain credit to play the machine with leaving the machine.

The particular gaming machine 10 shown in FIG. 1 includes the present invention which enables the player to obtain credit without having to leave his place at the machine with the use of a financial card of the type such as any well known credit card or a debit card such as an ATM card. Other cards of the type having a prearranged amount of credit stored on the card may also be used. Each time such card is used, the amount of credit available is reduced by the amount of credit used until the credit is totally depleted Such card is disclosed in U.S. Pat. No. 4,575,622. The machine 10 has indicators 14 which indicate to the player certain patterns or indicia. Particular combinations of these patterns are designated as winning combinations. The player inserts the coins in a slot such as a slot 19, activates the machine by pulling the handle 12, pushing buttons or taking some other action and observes the indicators in the displays 14 to determine if a winning combination is obtained. If so, the display 18 may indicate the amount won as a credit which the player may use to continue playing the machine without inserting additional coins. If the player wishes, he can elect to receive cash for the credit available and the appropriate value is obtained either by coins dropped or dispensed into a slot or tray 16 or the credit is redeemed from a cashier.

If the player has used all of his coins or credit he has won by playing the machine, the present invention enables him to obtain further credit without leaving the machine by inserting his financial card, either a credit card, a debit card or other available card 24 into slot 22. The card may be swiped through a groove instead of being inserted in a slot, if desired. The amount of credit desired is entered through the keyboard 20. The reader 26 associated with the machine 10 transmits from the card the information concerning the player to a remote location such as, for example, the player's financial institution along with a first code 27 identifying the gaming machine and, if necessary, a second code 29 identifying the establishment where the machine is located. The financial institution may then credit the establishment's account and debit the player's account in the amount entered into the keyboard. In an alternative system, the gaming machine 10 may issue a credit slip indicating the amount of credit obtained and which may be signed by the player, given to a casino employee and kept by the casino for return to the player's financial institution for proper credit. Of course the casino or establishment may be the financial institution in the sense that it can give pre-arranged credit to the player which can be utilized by the player through the means of a financial card used by the player, as described above.

Figure 2:
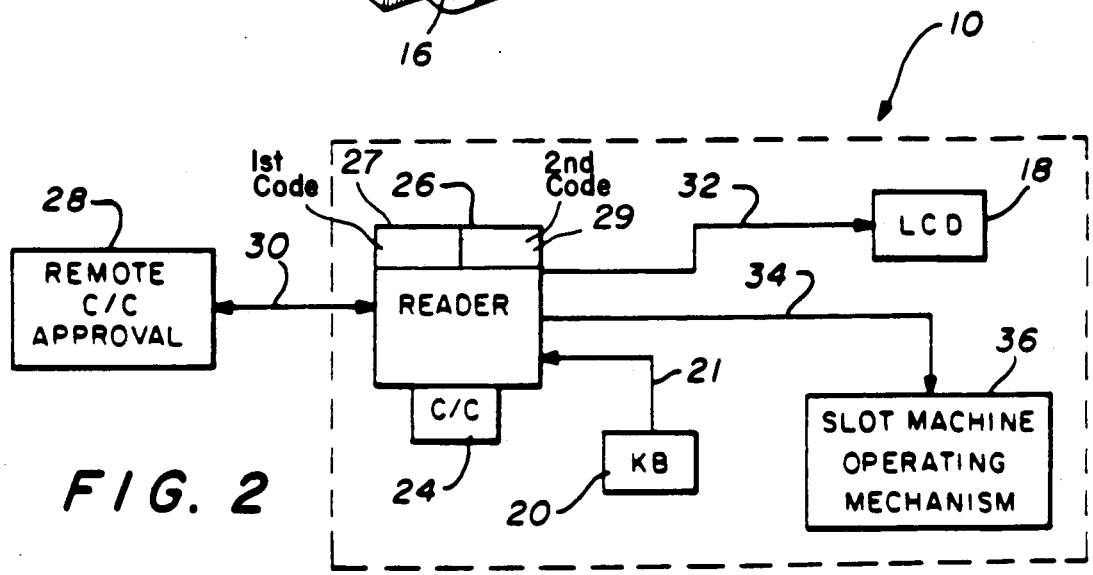
FIG. 2 is a diagrammatic representation of the circuit means necessary for obtaining the credit and which forms part of the gaming machine.

As shown schematically in FIG. 2, the gaming machine 10 includes a card reader 26 having a slot or groove in which the card 24 is inserted as illustrated in FIG. 1 or through which the card may be swiped. The reader 26 is coupled to a remote card approval financial institution 28 where is it determined if the card is entitled to the credit requested. Status of the card is returned over line 30 to reader 26 where the status is coupled to the liquid crystal display 18 on line 32. If the card is invalid, the display so indicates. If the card is acceptable for the amount of credit desired, the liquid crystal display 18 gives instructions to obtain the credit through the use of the keyboard 20. The information generated through the keyboard 20 is coupled on line 21 to reader 26 which provides the necessary signals on line 24 to the gaming machine operating mechanism 36 to allow the player to use the credit by operating the gaming machine. As indicated earlier, the gaming machine operating mechanism 36 is already in existence and is used by players where credit is accumulated from winnings on the machine and the player simply continues to play the machine using the available credit that has been previously won.

In this case, the credit approved by the remote financial institution is transferred to the machine and the machine operates in a well known manner to allow the player to continue to use the credit indicated. Thus with the novel invention forming part of the gaming machine as illustrated in FIG. 1, the player does not need to leave the machine to obtain further credit, but simply inserts his card in slot 22, enters the desired credit amount through keyboard 20 and when the remote institution has approved the credit, the machine indicates the amount of credit obtained and allows the player to continue to play the machine with the credit that he has obtained.

As stated previously, a card reading device may be used which allows the cards to be swiped through a slot 22 where it is automatically read and the same procedure followed to obtained the credit. Where a debit card is used, it would not be necessary to sign any credit slip since the unique code identifying the establishment and the unique code identifying the gaming machine are transmitted to the remote institution along with the player's identification and the proper debits and credits take place automatically.

In order for the invention to be used with the machine shown in FIG. 1, the necessary cabling must be connected to the machine and thus the machine has a fixed location and it cannot be moved without disconnecting all of the cables and reconnecting them at a new location This means that the machines can be used only in fixed locations where the necessary cabling is available.

Figure 3:
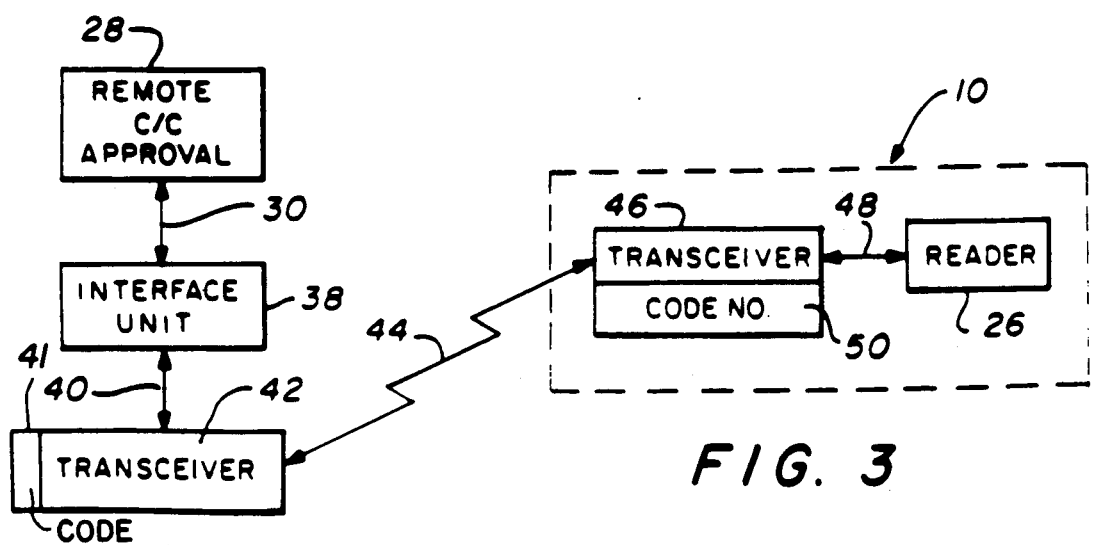
FIG. 3 is a diagrammatic representation of an alternate means for remotely communicating with the credit obtaining circuitry forming part of the gaming machine.

In order to make the machine portable, the invention may be modified as illustrated in FIG. 3 which is a diagrammatic representation of an alternate version of the novel invention in which a transceiver 46 is associated with the reader 26 shown in FIG. 2. The machine 10, in this case, need not be located in any particular fixed location, but can be moved as necessary to any desired location. In such case, the incoming signals from the financial institution approving the card are coupled on line 30, which may be, for example, a telephone line, to an interface unit 38 in the casino. The interface unit couples the incoming signals to transceiver 42 on line 40. Transceiver 42 sends the signals through the air into a corresponding transceiver 46 in the gaming machine. The output of the transceiver is then coupled to reader 26 shown in FIG. 2 and the system operates as described previously. A code unit 50 storing a unique code is associated with each transceiver 46 identifying the particular gaming machine 10 that is to receive the signal. Thus only that particular gaming machine 10 will be addressed from transceiver 42 when multiple gaming machines are being serviced in the same establishment. Such coding techniques are old and well known in the art. The unique codes may be assigned such that not only is the particular gaming machine 10 identified with its own code, but the establishment in which the machine is located may also be identified by a particular code 41 at transceiver 42, so that the remote financial institution approving the credit card has a record of not only of the gambling institution, but also the particular gaming machine receiving the credit.

Figure 4:
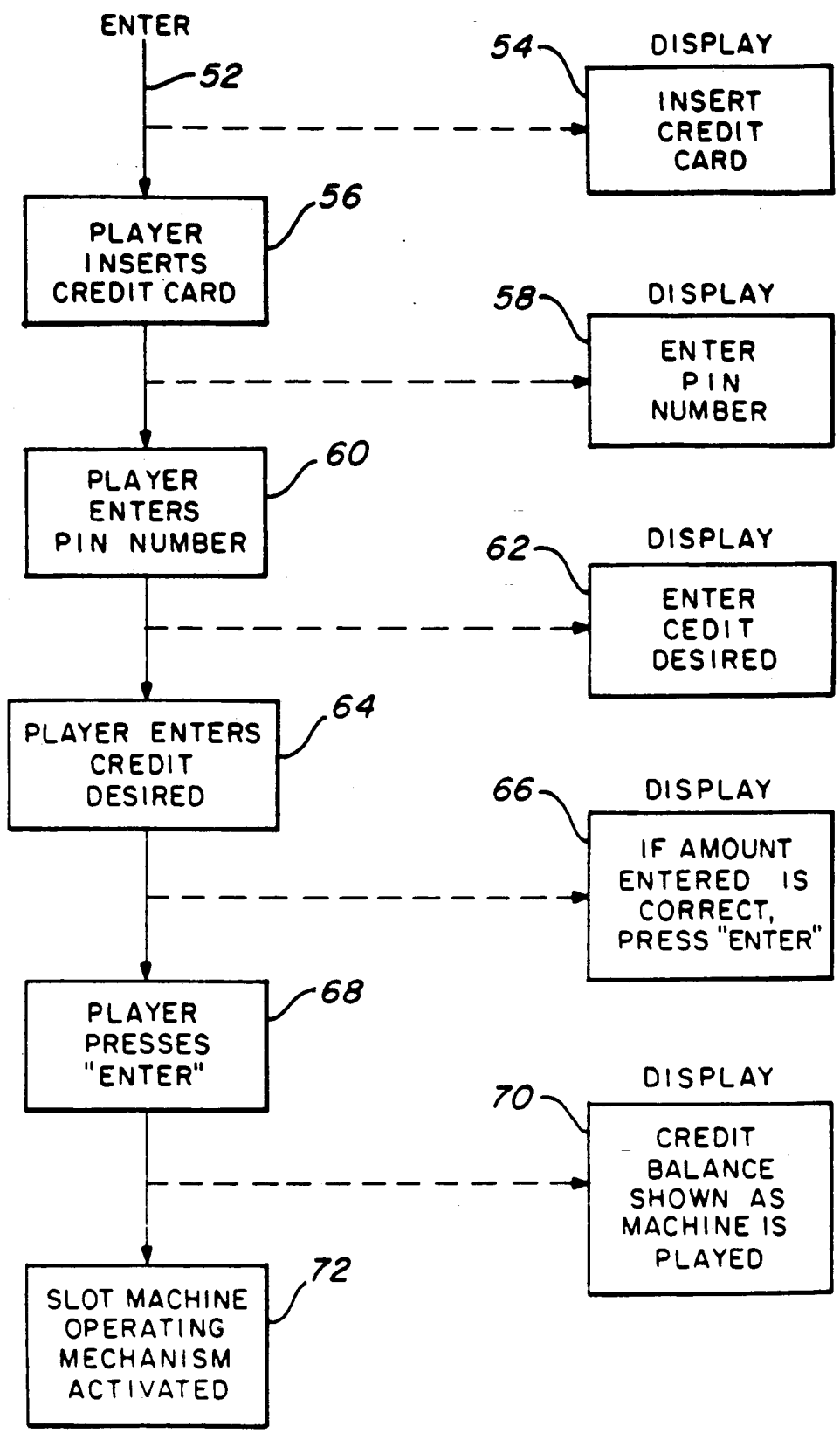
FIG. 4 is a flow chart illustrating the steps taken by the player to obtain credit at the machine without the player having to leave his place at the machine.

FIG. 4 illustrates a flow chart of the operation of the reader 26 and associated circuits in the gaming machine 10. The system is entered at 52 by the player observing the display at 59 which may indicate, for example only, "INSERT CREDIT CARD". At step 56, the card is inserted in slot 22 or swiped through a slot and the display is observed at step 58. The display may indicate, for example only, enter PIN number. At step 60 the player enters the PIN number through the keyboard and the display may indicate at 62 "ENTER CREDIT DESIRED". The player then enters the credit desired through the keyboard at step 62 and the display may indicate the amount entered and state "IF AMOUNT ENTERED IS CORRECT, PRESS ENTER". That is indicated at step 66. At step 68, the player presses the enter key and the display, at step 70 indicates the credit balance that was approved. As the machine is played the credit balance is reduced. Thus if $10.00 is indicated as the credit obtained, and each play of the machine costs $1.00, the credit balance as shown will decrease by $1.00 each time the machine is played until the credit balance is zero or is altered by winnings obtained by the player. At step 72, the slot machine operating mechanism is activated so that the player can continue playing the machine. Actuators 17 enable the player to accept odds in a well-known manner. The player can select patterns diagonally or across or bet variable amounts of credit with each play with the use of the actuators 17 in a well-known manner.

Thus, there has been disclosed a novel apparatus and method of enabling a gaming machine to provide credit to a player operating the machine without leaving his place at the machine. He simply swipes his card through the reader and enters through the keyboard the amount of credit desired, and the financial institution at a remote distance from the machine approves or denies the credit which is indicated on the display on the machine itself. When the credit is obtained, the machine allows the player to use that credit in playing the machine without the player having to leave the machine to obtain the credit.

While the invention has been described in connection with a preferred embodiment, it is not intended to limit the scope of the invention to the particular form set forth but, on the contrary, it is intended to cover such alternatives, modifications, and equivalents as may be included within the spirit and scope of the invention as defined by the appended claims.

I claim:

1. Apparatus for enabling an unattended gaming machine in an establishment having an account to provide playing credit to a player operating the machine from the player's existing credit account in a financial institution at a location remote from the establishment, said financial institution being different from the establishment, comprising:

an electronic circuit coupling the unattended machine to the remote financial institution having said player's account;

means for enabling said player to generate data representing the player's identity, a requested amount of playing credit to be charged to said player's account at said remote financial institution, and to cause generation of data regarding the establishment's identity;

means enabled by said player to automatically transmit said generated data through said electronic circuit to said remote financial institution for approval of said requested playing credit and transfer of said requested playing credit from said player's account to said establishment's account upon approval by said financial institution without requiring the player to leave his place at said unattended gaming machine;

means on said unattended machine for automatically receiving an indication of said approval of the requested amount of playing credit from said remote financial institution through said electronic circuit; and means coupled to said indication means for automatically enabling the player to use the approved playing credit to operate the unattended gaming machine.

2. Apparatus as in claim 1 wherein the means for enabling the player to generate data comprises:

a credit card reader as part of the gaming machine and coupled to said remote financial institution through said electronic circuit for enabling a credit card to be used solely by the player to request credit for the player to operate said gaming machine; and an alphanumeric keyboard on the gaming machine and coupled to the remote institution through said electronic circuit for entering the amount of credit requested by the player.

3. Apparatus as in claim 2 wherein the indication means is a liquid crystal display.

4. Apparatus as in claim 2 further comprising:

a source of a code identifying the establishment where the gaming machine is established, said code being associated with said card reader such that when said generated data is automatically transmitted through said electronic circuit to said remote financial institution, said code identifying said establishment is also transmitted to said remote financial institution.

5. Apparatus as in claim 2 further comprising:

a first transceiver located in the establishment and coupled to said remote financial institution; and a second transceiver forming a part of the gaming machine and coupled to the card reader and the alphanumeric keyboard for transmitting said generated data representing the player's identity and the amount of requested circuit by wireless transmission signals to and receiving wireless transmission signals representing said approval of the requested amount from the first transceiver approving or disapproving the player's requested credit so that the gaming machine is portable and may be moved from any one location to another desired location within the establishment.

6. Apparatus as in claim 5 further comprising:
a first coding unit associated with the first transceiver for establishing a first unique code identifying the establishment in which the gaming machine is located; and
a second coding unit associated with the second transceiver for storing, recognizing and transmitting by wireless transmission to the first transceiver a second unique code identifying the particular gaming machine such that the first transceiver, in receiving said wireless information from said second transceiver, transmits both codes and said player generated data to the financial institution and when transmitting wireless information to the gaming machine, said first transceiver transmits said second unique code that is recognized only by the gaming machine requesting credit with the player's financial card that has stored said second code.

7. A method of enabling an unattended gaming machine in an establishment, having an account, to provide playing credit to a player operating the machine from the player's credit account existing in an financial institution at a location remote from the establishment, said financial institution being different from the establishment, comprising the steps of:
coupling the unattended machine to the remote financial institution having said player's existing account with an electronic circuit;
enabling said player to generate data representing the player's identity and a requested amount of playing credit to be charged to said player's account at said remote financial institution and to cause generation of data regarding the establishment's identity;
automatically transmitting said generated data through said electronic circuit to said remote financial institution for approval of the requested amount and transfer of said requested credit from said player's account to said establishment's account upon approval by said financial institution at the request of said player and without requiring the player to leave his place at said unattended gaming machine;
automatically receiving at said unattended machine an indication of said approval of the requested amount of playing credit from said remote financial institution through said electronic circuit; and
automatically enabling the player to use the approved playing credit to operate the unattended gaming machine.

8. A method as in claim 7 wherein the step of enabling the player to generate data comprises the steps of:
forming a credit card reader as part of the gaming machine;
coupling the card reader to said remote financial institution through said electronic circuit for enabling a credit card to be used solely by the player to request said credit for the player;
generating signals representing the amount of credit requested by the player with an alphanumeric keyboard on the gaming machine; and
coupling the generated signals to the remote institution for approval through said electronic circuit.

9. A method as in claim 8 comprising the step of using a liquid crystal display as the to display said received indication.

10. A method as in claim 8 further comprising the steps of:
identifying the establishment where the gaming machine is located with a code; and
associating said code with said card reader such that when said generated data is automatically transmitted through said electronic circuit to said remote financial institution, said code identifying said establishment is also transmitted to said remote financial institution.

11. A method as in claim 8 further comprising the steps of:
locating a first transceiver in the establishment;
coupling the first transceiver to said remote financial institution through said electronic circuit;
locating a second transceiver within the gaming machine; and
coupling said second transceiver to said card reader and said alphanumeric keyboard for transmitting said generated data representing the player's identity and the amount of requested credit by wireless signals to and receiving wireless transmission signals representing said approval of the requested amount from the first transceiver approving or disapproving the player's requested credit so that the gaming machine is portable and may be moved from any one location to any other desired location within the establishment.

12. A method as in claim 11 further comprising the steps of:
assigning a first unique code to the first transceiver for identifying the establishment in which the particular gaming machine is located;
assigning a second unique code to the second transceiver for identifying the associated gaming machine such that said second code is transmitted to said first transceiver as part of said generated data;
transmitting both the establishment code and the gaming machine code to the remote financial institution with said first transceiver as part of said generated data;
receiving data representing credit approval at said first transceiver from the remote financial institution;
transmitting by wireless signal from said first transceiver the received data representing the approved credit along with said second unique code;
receiving said credit approval data and said second unique code in said gaming machine; and
recognizing said second code only by said gaming machine requesting credit with the player's financial card that is identified by said second code.

13. Apparatus for enabling an unattended gaming machine in an establishment, having an account, to provide credit to a player operating the machine from the player's existing credit account in a financial institution at a location remote from the establishment, said financial institution being different from the establishment, comprising:
means coupled to said unattended gaming machine for establishing a code identifying the establishment in which the unattended gaming machine is located;
means forming part of the unattended gaming machine to enable said player to generate data representing the player's identity and a requested amount of credit to be provided by said player's account at said remote financial institution;
means associated with said unattended gaming machine to automatically transmit said generated data and said establishment identifying code to said remote financial institution for approval of said requested amount of credit and transferring of the requested amount of credit from the player's existing account to the establishment's account without requiring the player to leave his place at said unattended gaming machine upon approval by said financial institution;

means coupled to said unattended machine for receiving and displaying data from said remote financial institution representing the credit approved; and means coupled to the data receiving and displaying means for enabling said player to use the displayed credit to operate the gaming machine.

* * * * *